Figure 1:
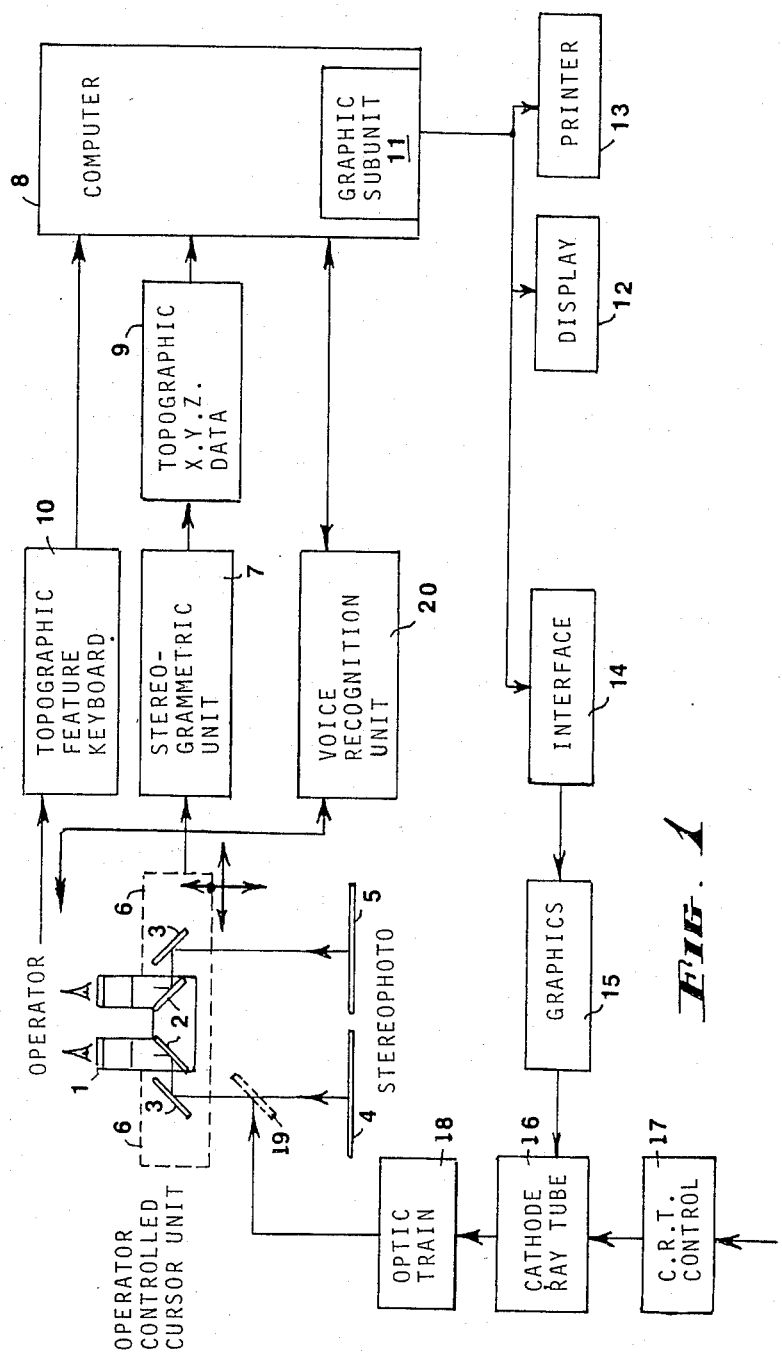

United States Patent [19]

Galbreath et al.

[11] Patent Number: 4,539,701
[45] Date of Patent: Sep. 3, 1985

[54] PHOTOGRAMMETRIC STEREOPLOTTER

[75] Inventors: Ronald E. Galbreath, Elizabeth; Bruce R. Harrison, Wanniassa, both of Australia

[73] Assignee: The Commonwealth of Australia, Australia

[21] Appl. No.: 448,848
[22] PCT Filed: Sep. 24, 1982
[86] PCT No.: PCT/AU82/00161
§ 371 Date: Dec. 10, 1982
§ 102(e) Date: Dec. 10, 1982
[87] PCT Pub. No.: WO83/01305
PCT Pub. Date: Apr. 14, 1983

[30] Foreign Application Priority Data

Oct. 1, 1981 [AU] Australia ............................... PF1004

[51] Int. Cl.³ .................... G01C 11/12; G06K 9/00
[52] U.S. Cl. ........................................ 382/1; 250/558; 350/136; 356/2; 381/110; 382/41; 382/60
[58] Field of Search ................ 356/2, 12–14, 356/376, 444; 364/560–562, 719, 721, 728; 250/558; 358/96; 382/41, 58, 60, 1; 350/136; 33/20 D, 23 C

[56] References Cited

U.S. PATENT DOCUMENTS

| | | | |
|---|---|---|---|
| 2,704,960 | 3/1955 | Loud | 88/29 |
| 3,677,645 | 7/1972 | Johnston | 356/2 |
| 3,729,830 | 5/1973 | Blachut et al. | 350/136 |
| 3,989,933 | 11/1976 | Inghilleri | 350/136 |
| 4,281,923 | 8/1981 | Friedman | 356/2 |
| 4,290,694 | 9/1981 | Wehrli et al. | 356/2 |
| 4,462,080 | 7/1984 | Johnstone et al. | 381/110 |

FOREIGN PATENT DOCUMENTS

| | | |
|---|---|---|
| 1020341 | 11/1977 | Canada . |
| 1124187 | 10/1956 | France . |
| 573587 | 3/1976 | Switzerland . |
| 567955 | 9/1977 | U.S.S.R. . |

OTHER PUBLICATIONS

Flanagan, "Computers That Talk and Listen: Man-Machine Comm. by Voice", *Proc. of the IEEE*, vol. 64, No. 4, Apr. 1976, pp. 405–415.

"The Implementation of Graphics Superposition on the APPS-IV Analytical Plotter", by Greve et al., pp. 492–498, date unknown.

*Primary Examiner*—Leo H. Boudreau
*Attorney, Agent, or Firm*—Cushman, Darby & Cushman

[57] ABSTRACT

A photogrammetric stereoplotter using a stereoscopic binocular unit (1) to provide an image of spatially separated masters (4,5) and including a cursor (6) providing X Y coordinates and measuring marks providing Z coordinates in which the X Y Z coordinates are fed through a stereogrammetric unit (7) to a computer (8) with a display and/or printer (12,13) and an interface (14) to a display tube (16) and through an optic train (18) to at least one side of the binocular unit (1), and including a topographic keyboard unit (10) arranged to feed information to record the trace, and optionally a voice recognition unit (20) with two-way communication between operator and computer (8), and means in the computer (8) whereby model coordinates from the said binocular unit (1) are changed to image coordinates by the computer (8) to achieve precise superimposition of the trace image to eliminate visual disturbance.

6 Claims, 2 Drawing Figures

PHOTOGRAMMETRIC STEREOPLOTTER

This invention relates to a photogrammetric stereoplotter.

It is well known art to photograph terrain stereoscopically and to then view the photographs through a stereo viewer usually comprising binoculars with a mirror system which reduces the spread of the optical axes to allow relatively larger photographs to be placed side-by-side for viewing at normal interocular distance.

To be able to plot contours or other features from such a viewer it is known to use a pair of markers, generally referred to herein as "dots" which can be moved as a pair in a plane parallel to the photographs for the purpose of measuring position on a horizontal plane and can be varied in their spatial separation to determine perpendicular distance. For this purpose the dots are generally formed on a pair of transparent members carried on a cursor unit which dots move together in X and Y axes on a plane parallel to the photographs and generally perpendicular to the viewing axis but can be moved to vary the distance between them to measure altitude along a Z axis. These dots are so positioned that one is appropriately positioned to appear over each photograph.

To trace the contours the cursor unit is moved in the plane parallel to the picture surface with the dots spaced to represent stereoscopically a selected altitude, and a trace of the contour is made, in the case of an older form of the device, by a pantograph coupled to the cursor unit which produces the trace on a plotting surface adjacent to the stereo viewer, but it will be appreciated that the method of producing the trace can be varied such, for instance, as by varying the spatial separation of the dots while traversing the photographs to record the altitude changes of the terrain.

A problem which occurs is that, because the manipulation of the cursor unit is subject to human error, it is necessary periodically to check the trace produced by the pantograph pen, or other device which records the motion, and this requires the operator to leave the eyepieces to look at the plotting sheet, or if using an integral plotting table, to peer between the equipment in front of the operator. Attention to the relative positions of contours, creeks and roads being drawn is important when these features run close together, as serious errors could occur from imperfections in the drafting process, or if the pen fails to mark.

The process is required to check for the completeness of a plotted feature and to correct errors in plotting by first erasing the error and then replotting the section. This problem is exacerbated when the stereoplotter is equipped with digital encoders to produce X, Y and Z coordinates of the plotted features as the operator is then required to look away even more frequently to enter computer commands and feature descriptions by a computer console device.

It is also known art to provide a video or computer generated cathode ray tube display either adjacent to the stereoplotter eye-pieces to minimise operator head movement or to superimpose these images into the stereo model field of view. However these devices do not provide an optimal solution in the display or superimposition method or the means to manipulate the displayed image without looking away from the eye-pieces.

As an example of the type of prior art in this field reference can be made to Canadian Pat. No. 1,020,341 granted to Her Majesty in right of Canada as represented by the National Research Council of Canada, which relates to an analytical plotter in the form of a stereo comparator in a closed loop with a computer in which the inputs are photographs and the output is digital or analogue data. A typewriter is used for the operator's input, through which the operator communicates with a computer by two handwheels for X and Y motion and a footwheel for elevation to move the photo-carrier. In this corresponding commands are generated and which the computer accepts from the handwheel and footwheel encoders via a buffer unit, and go via a servo-control-logic to photo-carrier servos so that the two photographs are at all times controlled to present a properly fused and positioned stereo model to the operator. The device also includes image transfer optics for superimposing an image of the recording medium into the photo viewing optic means of the photogrammetric instrument.

An object of the present invention is to provide certain improvements to a device of this general type to further increase the accuracy of the plotting and to relieve the strain on the operator by removing the disadvantages which exist in the known devices of providing precise superimposition only at points where the terrain height corresponds to the parallax or height setting of the stereoplotter, which in the present devices is very distractive to the operator.

A further object also is to provide further control means because the operator requires to manipulate both hand-moved mechanisms and foot control to meet the requirements of the X, Y and Z axes, and this is achieved according to this invention by utilising a voice control system which will feed in data to the computer such as commands, and will provide a voice feed back to the operator to in effect increase the communication existing in this type of instrument. The voice operated channel consists of a voice recognition and synthesis computer into which commands of the operator are fed to enable the computer to carry out such commands merely by voice actuation, thus giving a highly effective additional channel and further removing the need of the operator to take his eyes away from the stereoscopic vision system as it enables him to plot three axes in the normal manner but to insert added data at required areas as and when needed without having to lose visual concentration.

The objects of the invention are achieved by superimposing the trace image being plotted together with the other data which may be required on the stereo model as it is viewed through the binoculars such that the trace image appears on one or both of the constituent photographs of the stereo model superimposed over the photograph image of the trace.

In the case of one trace image the operator will perceive a precise superimposition over the entire field of view. In the case of dual trace images the operator will perceive a precise three-dimensional trace image over the entire field of view of the photographic model. The trace image described above is generated by converting stereo model or map coordinates to photo image coordinates by well known projective formula.

As said the known art map or model coordinate superimposition technique suffers from the disadvantage of providing precise superimposition only at points where the terrain height corresponds to the parallax or height setting of the stereoplotter.

The present invention is applicable to any analogue or analytical stereoplotter equipped with digital encoders, and in it the trace image is generated on a high resolution (for example 1024 by 1280 resolution units) dynamic display which can be raster graphics, cathode ray tube, liquid crystal display, light valve or other similar technology.

The display is under the control of a computer and the main display image is erasable point by point. The computer collects the X, Y and Z model coordinates, converts these coordinates into image coordinates and generates the image trace of the measuring mark or marks.

The computer also generates and displays point, line and area symbols depicting the map information collected. For example when a windmill is digitized the map symbol for a windmill is generated and the symbol image traced.

In a like manner previously plotted maps and stereo models can be superimposed over either the same or new photographic stereo models by regenerating the image trace described. This feature is particularly useful in the revision and quality assurance of maps and stereo model plots.

A further component of the invention is the use of a voice recognition and synthesis computer to provide operator control of the image trace and the computer controlling the stereoplotter data collection. Using this device the operator can enter by voice feature identifications, display and edit commands to the digital data collected and the image trace and other control functions of the computer.

In its preferred form the invention thus uses a method of plotting an image through a stereoscopic binocular unit from a pair of spatially separated masters which comprises operating a cursor on X Y coordinates and observing a measuring mark having its apparent height at an altitude above the datum line selected by the spatial separation of a pair of measuring marks one above each master to produce a Z coordinate display point, and transferring the X Y Z model coordinates to a computer which processes the model coordinates to produce image coordinates and an image trace, applying the image trace to a display and/or printer and also to a picture tube and by means of an optic train into the stereoscopic binocular unit to be superimposed on the stereoscopic image of the said masters, and applying further control and data feed back by a voice recognition unit coupled to the said computer. The image trace is generated point by point as the operator moves the measuring mark to trace out the map features such that the trace appears to the operator to be drawn by the measuring mark. Likewise an image trace of any previous digitized model or part model can be instantly superimposed on the terrain model.

Figure 2:
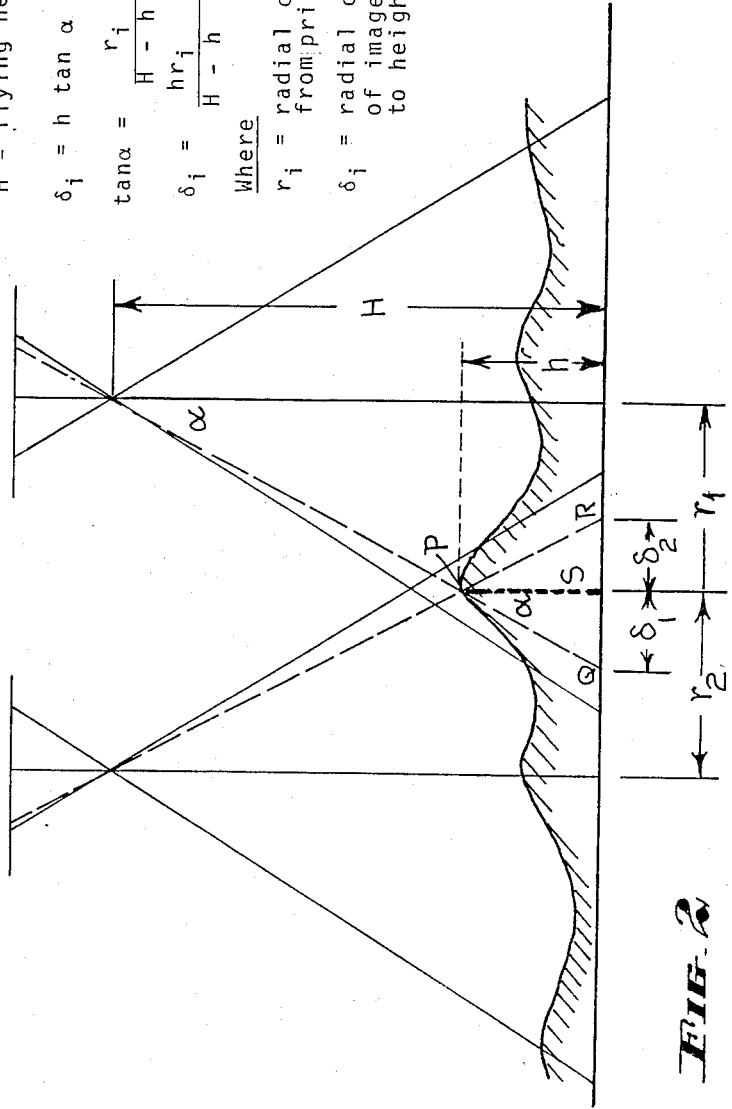

To enable the invention to be fully appreciated, a preferred embodiment thereof will now be described with reference to the accompanying drawings which are to be taken as illustrative only and in which:

FIG. 1 is a block diagram which shows the invention applied to a digital stereoplotter, and FIG. 2 shows how the parallax correction is applied.

In the form illustrated the binocular viewer 1 has mirrors 2—2 and 3—3 to enable a stereophoto pair 4–5 to be viewed, and with the binocular viewer 1 is associated a cursor unit 6 which is movable in X, Y axes parallel to the stereophoto axis 4–5 and carries the dots in a manner such that they are projected one each into the field of view of the binocular viewer 1 but themselves spaceable in distance in the plane of movement of the cursor unit to give binocular viewing along a Z axis normal to the X, Y axes.

The movement of the cursor unit 6 is transferred to a stereogrammetric unit 7 which is linked to the computer 8 through the topographic X Y Z data unit 9, the computer 8 being fed extra required information by the operator such as contours, creeks, roads etc. through the topographic feature keyboard 10, but also by the voice recognition unit referred to later herein.

The graphics unit 11 of the computer 8 feeds out to a display unit 12 and a printer 13, but also to an interface 14 from which the graphics 15 are fed to a cathode ray tube 16 which has a control 17 for brilliance and other adjustments and directs the trace through an optics train 18 to the beam splitter 19 which injects the plotted data such as contours, creeks, roads etc. to one side of the binocular viewer to visually transpose the trace onto the stereophoto.

The voice recognition unit 20 is trained by the operator speaking the desired command/feature identifier into a voice actuated microphone and entering the required interpretation of the utterance into the computer. Such voice recognition units are known but have not been adapted to stereoplotters as herein.

The recognition unit 20 digitally encodes the utterance phonems, performs statistical analysis of the phonems and compresses and stores the digital record of the phonems. Having stored the digital records for all the required commands the recognition unit is switched from the training mode to the recognition mode. For every utterance entry into the microphone the processor encodes the entry, searches the stored records for a matching record within a preset statistical threshold and selects the command of the best matching digital record.

The synthesis portion of the unit is trained by having a preset compressed digital record of a library of phonems. Each required response is generated by selecting the proper phonems, storing their digital records and allocating a code to that digital record string.

In the synthesis mode of operation the control computer issues the code for the required response and the unit extracts the stored digital record of the phonem string and makes the audio utterance from an audio modulator.

Using this voice recognition/synthesis unit the stereoplotter operator can enter any predefined instruction to the control computer and the control computer can be programmed to issue any required voice response, and the importance of this can be appreciated when it is seen as a channel added to the X Y Z controls without the operator having to sacrifice X Y Z control as occurs if the operator has to use a keyboard.

FIG. 2 illustrates how the operator would normally see the terrain point P in a three-dimensional arrangement, but also the points Q and R, that is the right image coordinate of P and the left image coordinate of P on the terrain and at S is the model or map coordinate of point P. It will be appreciated that S will not be seen in precise superimposition over the three-dimensional model unless the measuring mark parallax is adjusted so that point S is perceived to be at the same height as the point P, that is, coincident.

The remedy to this defect is achieved by having in the computer 8 an algorithm to translate model coordinates to image coordinates for the production of the image trace, and involves deriving Q and/or R from S, for example for the left image trace $$R = S + \delta_2$$

$$\therefore R = S + \frac{hr_2}{H - h}$$

It will be seen that the resultant image trace will be a precise superimposition over the three-dimensional model and irrespective of the measuring mark apparent height.

The general case for a point $P_i$ is thus $$\delta_i = h_i \tan \alpha$$

$$\tan \alpha = \frac{r_i}{H - h_i}$$

$$\delta_i = \frac{hr_i}{H - h_i}$$

where
$h_i$=terrain height above map datum
$H$=flying height
$r_i$=radial distance between P and the principal point of the photograph
$\delta_i$=radial displacement of image point due to height The application of the algorithm thus has the effect of changing the model coordinates to an image coordinate trace so that the operator perceives the trace in true superimposition with the three-dimensional terrain surface. In the case of dual trace image superimposition the image trace itself will appear in three-dimensions superimposed precisely on the three-dimensional terrain surface.

From the foregoing it will be realised that the invention comprises a photogrammetric stereoplotter wherein the image being plotted through a stereoscopic binocular unit from a pair of spatially separated masters such as photographs is back-projected into the field of view of at least one side of the binocular viewer to be visible with the masters and the movable dots.

The image of the trace is superimposed on the matter being plotted and can be continuously visible to the operator, while intensity and position can be controlled so as not to interfere with the normal stereoscopic vision of the operator.

The invention can be applied in any field, not necessarily in the mapping field, where stereoscopic plotting is required with the need of the operator to be able to view the trace.

We claim:

1. A method of plotting an image through a stereoscopic binocular unit from a pair of spatially separated masters comprising the steps of:
    operating a cursor on X Y model coordinates and observing a measuring mark having its apparent height at an altitude above a datum line selected by the spatial separation of measuring marks, one above an image of each of said masters, to produce a Z model coordinate;
    transferring said X Y Z model coordinates to a computer to produce an image trace;
    processing said model coordinates to produce image coordinates to reduce subsequent visual disturbances;
    applying said image trace to: (a) a display means, (b) a picture tube and (c), by means of an optic train, said stereoscopic binocular unit to be superimposed on a stereoscopic image of sad masters; and
    applying further control and data feed-back by a voice recognition unit coupled to said computer.

2. A photogrammetric stereoplotter comprising:
    stereoscopic binocular means for viewing a pair of spatially separated stereo masters;
    cursor means for imaging movable marks of a cursor through said binocular means, said cursor means being capable of planar movement and allowing separation of said marks to vary;
    stereogrammetric means for associating X Y model coordinates from planar movement of said cursor means with a Z model coordinate derived from the degree of separation of said marks;
    processing means for: (a) generating a trace related to movement of said marks and (b) changing said model coordinates from said stereogrammetric means to image coordinates to achieve superimposition of said trace over the complete field of view of said binocular means, thereby eliminating visual disturbance, said processing means including a graphic output unit for outputting said trace;
    means for recording said trace from said graphic output unit of said processing means;
    display means;
    an interface between said graphic output unit and said display means;
    means for optically coupling an image on said display means to at least one side of said binocular means to visually superimpose said trace on an image of at least one of said stereo masters; and
    topographic feature means for adding information to said recorded trace in addition to said X Y Z coordinates.

3. A photogrammetric stereoplotter according to claim 2 wherein said processing means collects information from said topographic feature means to: (a) control said model coordinates and generate said trace and to (b) generate and display point, line and area models depicting information contained in said stereo masters.

4. A photogrammetric stereoplotter 2 further comprising voice recognition means, connected at least to said processing means, for allowing information to be added by an operator by voice control whereby said operator may retain his capacity to manually independently control said cursor means.

5. A photogrammetric stereoplatter according to claim 4 wherein said voice recognition means also encodes utterance phonems, performs statistical analyses of the phonems, compresses and stores a digital record of the phonems, subsequently issues commands to said processing means on voice energisation, and, in a synthesis mode, issues audible signals.

6. A photogrammetric stereoplotter according to claim 2 wherein said topographic feature means includes a keyboard connected to said processing means.

* * * * *